(12) United States Patent
Mazzini et al.

(10) Patent No.: US 11,249,266 B2
(45) Date of Patent: Feb. 15, 2022

(54) CONFIGURABLE OPTICAL ASSEMBLIES IN OPTICAL CABLES

(71) Applicant: Cisco Technology, Inc., San Jose, CA (US)

(72) Inventors: Marco Mazzini, Seville (ES); Alberto Cervasio, Cuorgne' (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/691,342

(22) Filed: Nov. 21, 2019

(65) Prior Publication Data

US 2021/0157076 A1    May 27, 2021

(51) Int. Cl.
| | | |
|---|---|---|
| *H04B 10/00* | (2013.01) |
| *G02B 6/42* | (2006.01) |
| *G02B 6/44* | (2006.01) |
| *H04B 10/80* | (2013.01) |
| *H04B 10/40* | (2013.01) |
| *H04B 10/25* | (2013.01) |

(52) U.S. Cl.
CPC ......... *G02B 6/4293* (2013.01); *G02B 6/4403* (2013.01); *H04B 10/25891* (2020.05); *H04B 10/40* (2013.01); *H04B 10/801* (2013.01); *H04B 10/808* (2013.01)

(58) Field of Classification Search
CPC .............. H04B 10/40; H04B 10/25891; H04B 10/801; H04B 10/808; H04B 10/2589; H04B 10/2581; G02B 6/4293; G02B 6/4403; G02B 6/3885; G02B 6/3874; G02B 6/3817; G02B 6/3893; G02B 6/4246; G02B 6/12021; G02B 6/14; G02B 6/428; G02B 6/13; H01R 13/62983
USPC ........ 398/135, 138, 139, 164, 115–117, 171, 398/178
See application file for complete search history.

(56) References Cited

U.S. PATENT DOCUMENTS

| | | | |
|---|---|---|---|
| 4,886,335 A | * | 12/1989 | Yanagawa ............ G02B 6/3825 385/16 |
| 9,116,313 B2 | | 8/2015 | Traverso et al. |
| 9,551,838 B2 | | 1/2017 | Jones et al. |
| 9,804,348 B2 | | 10/2017 | Badihi et al. |
| 9,980,021 B2 | | 5/2018 | Oltman et al. |
| 2002/0181058 A1 | * | 12/2002 | Ger ..................... H04B 10/801 398/164 |

(Continued)

FOREIGN PATENT DOCUMENTS

| | | |
|---|---|---|
| CN | 107346053 A | 11/2017 |
| EP | 3111261 A2 | 1/2017 |

(Continued)

*Primary Examiner* — Hibret A Woldekidan
(74) *Attorney, Agent, or Firm* — Patterson + Sheridan, LLP

(57) ABSTRACT

Embodiments herein describe an intelligent optical cable that includes an optical assembly disposed between two pluggable connectors. In one embodiment, the optical assembly in the intelligent optical cable are coupled to the pluggable connectors via respective ribbons, where first ends of the ribbons are connected to the optical assembly while second ends of the ribbons are connected to respective pluggable connectors. In one embodiment, the optical assembly includes a photonic chip which performs an optical function on the optical signals propagating in the optical cable.

13 Claims, 14 Drawing Sheets

(56) References Cited

U.S. PATENT DOCUMENTS

| | | | |
|---|---|---|---|
| 2004/0158662 A1* | 8/2004 | Konda | H04N 7/22 710/72 |
| 2006/0031611 A1* | 2/2006 | Konda | H04N 7/22 710/72 |
| 2007/0014522 A1* | 1/2007 | Yamaguchi | G02B 6/3817 385/88 |
| 2014/0248057 A1* | 9/2014 | Li | G02B 6/4446 398/82 |
| 2015/0010267 A1 | 1/2015 | Levy et al. | |
| 2015/0010268 A1 | 1/2015 | Badihi et al. | |
| 2015/0104169 A1 | 4/2015 | Tang et al. | |
| 2016/0019665 A1 | 1/2016 | Collier et al. | |
| 2016/0195685 A1* | 7/2016 | Wang | G02B 6/4292 385/89 |
| 2016/0252687 A1 | 9/2016 | Badihi et al. | |
| 2016/0370544 A1 | 12/2016 | Badihi et al. | |
| 2017/0139145 A1 | 5/2017 | Heanue et al. | |
| 2018/0217344 A1* | 8/2018 | Fini | G02B 6/4243 |
| 2019/0072720 A1 | 3/2019 | Heanue et al. | |
| 2019/0113680 A1* | 4/2019 | Sodagar | G02B 6/4246 |
| 2019/0146169 A1* | 5/2019 | Grandidge | G02B 6/4284 375/257 |

FOREIGN PATENT DOCUMENTS

| | | | |
|---|---|---|---|
| EP | 3111571 | A1 | 1/2017 |
| EP | 3357180 | A1 | 8/2018 |
| EP | 3374824 | A1 | 9/2018 |
| WO | 2015001429 | A1 | 1/2015 |

* cited by examiner

CONFIGURABLE OPTICAL ASSEMBLIES IN OPTICAL CABLES

TECHNICAL FIELD

Embodiments presented in this disclosure generally relate to intelligent optical cables, and more specifically, to embedding configurable optical assemblies into optical cables.

BACKGROUND

The continuous rise of bandwidth capacity has spurred new modulation formats (PAM4, pulse amplitude modulation) that are defined into new IEEE standards 802.3bs (400 Gb/s) and 802.3cd (200/50 Gb/s). To achieve 100 G per port optical communication (e.g., 53 GBaud), electrical integrated circuits (ICs) (e.g., application specific integrated circuits (ASICs)) are coupled on or near photonic chips to drive and modulate optical signals in the photonic chips. While the electrical ICs can, in principle, be partially reconfigured, several photonic circuits are physically added to a linecard in order to fully support different optical configurations and links. As a result, port associations are inflexible which preclude the linecards from being easily configured to support different functions, such as different polarization mode dispersion (PMD) types and structures, expanding optical links, bidirectional ports, and the like.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
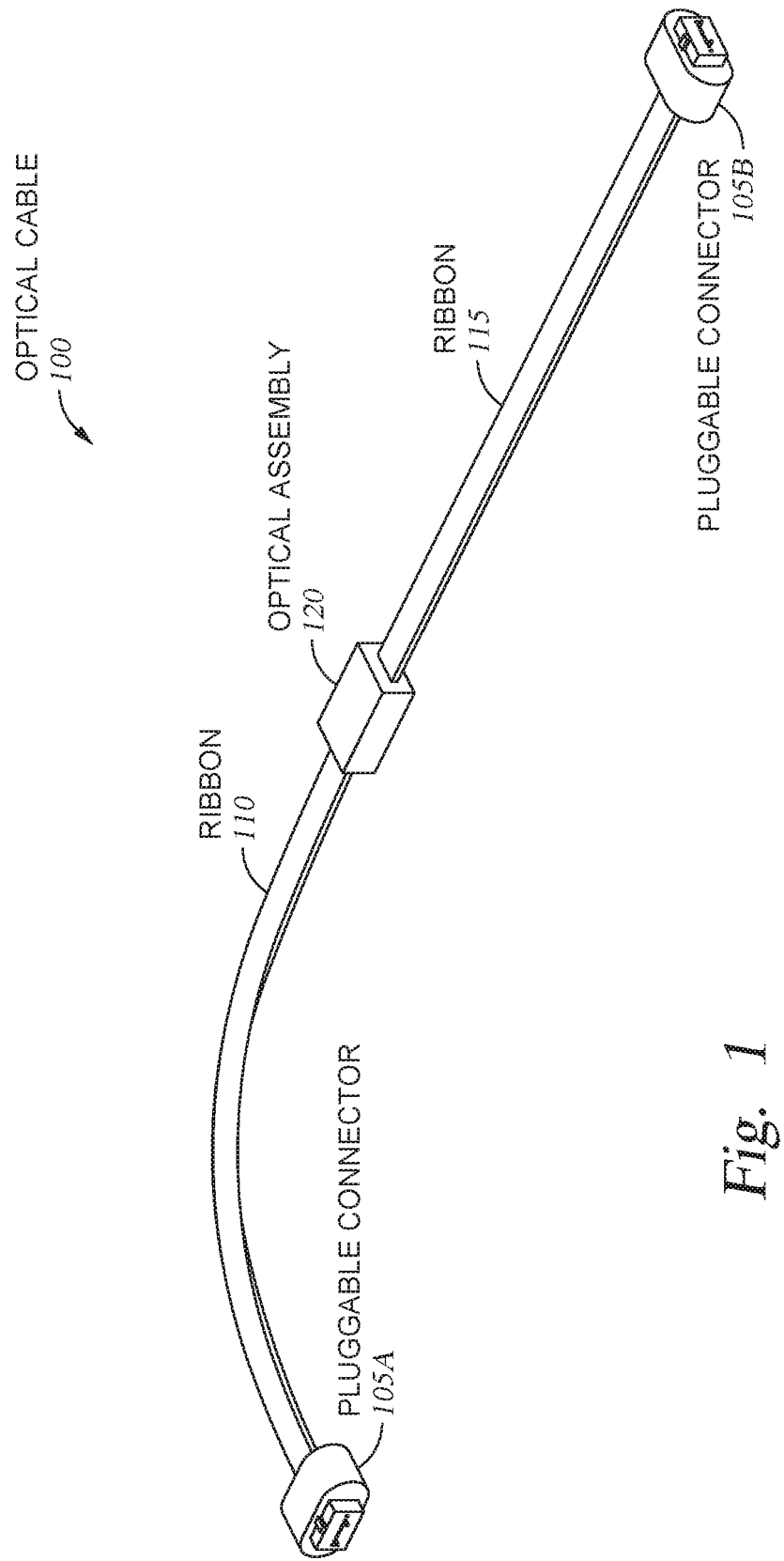
FIG. 1 illustrates an intelligent optical cable, according to one embodiment described herein.

One embodiment presented in this disclosure is an optical cable that includes a first pluggable connector, a second pluggable connector, an optical assembly, a first ribbon having a first end connected to the first pluggable connector and a second end connected to the optical assembly where the first ribbon comprises a plurality of optical fibers and a plurality of wires for delivering power and communication signals to the optical assembly, and a second ribbon having a first end connected to the optical assembly and a second end connected to the second pluggable connector, where the second ribbon comprises a plurality of optical fibers and where the optical assembly is configured to perform an optical function on optical signal propagating through the first and second ribbons.

Another embodiment described herein is an optical cable that includes a first pluggable connector, a second pluggable connector, a plurality of optical assemblies each configured to perform an optical function on optical signals propagating through the optical cable, and a plurality of ribbons each comprising a plurality of optical fibers where the plurality of ribbons connect the first and second pluggable connectors to the plurality of optical assemblies and where the optical signals propagate between the first and second pluggable connectors by passing through at least two of the plurality of optical assemblies.

Another embodiment described herein is a linecard that includes a first photonic chip, an adapter optically coupled on a first side to the first photonic chip, and an optical cable plugged into a second side of the adapter. The optical cable includes at least two ribbons comprising optical fibers, and a second photonic chip disposed between the at least two ribbons such that optical signals propagate through the at least two ribbons via the second photonic chip where one of the at least two ribbons comprises a plurality of wires for delivering power and communication signals to the second photonic chip and where the power and the communication signals are generated by the first photonic chip.

Example Embodiments

Embodiments herein describe an intelligent optical cable that includes an optical assembly disposed between two pluggable connectors. In contrast, a passive optical cable does not include an optical assembly, but rather includes a ribbon containing optical fibers that extend between two pluggable connectors. In one embodiment, the optical assembly in the intelligent optical cable is coupled to the pluggable connectors via respective ribbons, where first ends of the ribbons are connected to the optical assembly while second ends of the ribbons are connected to respective pluggable connectors.

In one embodiment, the optical assembly includes a photonic chip which performs an optical function on the optical signals propagating in the optical cable. For example, the photonic chip can include optical switches, optical filters, optical amplifiers, optical attenuators, and the like. In one embodiment, the optical assembly is configurable using signals received from an external controller (e.g., an external electrical IC or external photonic chip). To route data signals and power to the optical assembly, the ribbon and pluggable connector connected to the external controller include power rails and communication links that permit the external controller to provide power and instructions to the optical assembly. That is, in addition to containing optical fibers, at least one of the ribbons can route power and communication signals to the optical assembly. In this manner, the external controller can configure the optical assembly to perform a specific optical function. Further, in one embodiment, the external controller can dynamically reconfigure the optical assembly to perform a different function from its initial task.

FIG. 1 illustrates an intelligent optical cable 100, according to one embodiment described herein. The optical cable 100 includes two pluggable connectors 105 disposed on opposite ends of the cable 100. The pluggable connectors 105A and 105B include optical interfaces and alignment features (which will be described later) for receiving optical signals into the cable 100 or transmitting optical signals from the cable 100 into a connected device (e.g., a photonic platform). The cable 100 also includes ribbons 110, 115 that are connected to the connectors 105A and 105B. The ribbons 110, 115 include multiple optical fibers (single mode or multi-mode optical fibers) for transmitting optical signals between the pluggable connectors 105A and 105B. Moreover, at least one of the ribbons 110, 115 includes electrical wires for transmitting power and communication signals to an optical assembly 120 disposed between the ribbons 110, 115. That is, in addition to containing optical fibers, one or both of the ribbons 110, 115 includes wires that transmit power and digital communication signals from one of the connectors 105A and 105B to the optical assembly 120.

The optical assembly 120 is connected to respective ends of the ribbons 110, 115. For an optical signal to traverse between the connectors 105A and 105B, it travels through both the ribbons 110, 115 and the optical assembly 120. In one embodiment, the optical assembly 120 includes a photonic chip (e.g., a photonic semiconductor chip such as a silicon photonic chip) that performs an optical function on the optical signals. For example, the optical assembly 120 may perform optical switching, routing, filtering, amplification, attenuation, and the like. While the optical assembly 120 could include an electrical IC for controlling the photonic chip in the assembly 120, in one embodiment it does not. In that scenario, the optical assembly 120 may perform optical functions on the optical signal but not electrical functions such as converting an optical signal into an electrical signal using a photo detector and an electrical IC. However, in another embodiment, the optical assembly 120 may perform opti-electrical conversions. The structure of the optical assembly 120 is discussed in more detail in FIG. 5.

The optical assembly 120 can be powered using power rails carried in one of the ribbons 110, 115. For example, a photonic platform coupled to one of the connectors 105A and 105B can also deliver power to that connector which is then routed to the optical assembly 120 so it can perform its optical function or functions. In addition to power, the photonic platform can also transmit data instructions to control or configure the optical assembly 120. That is, the photonic platform (or an electrical IC) can send instructions using communication links in one of the ribbons 110, 115 that activate one or more optical functions in the optical assembly 120, deactivate one or more optical functions, or switch from performing one optical function to performing a different optical function. Because of the ability of an external controller (e.g., the photonic platform) to control the optical function of the optical assembly 120, the optical cable 100 is described as being intelligent.

Figure 2A:
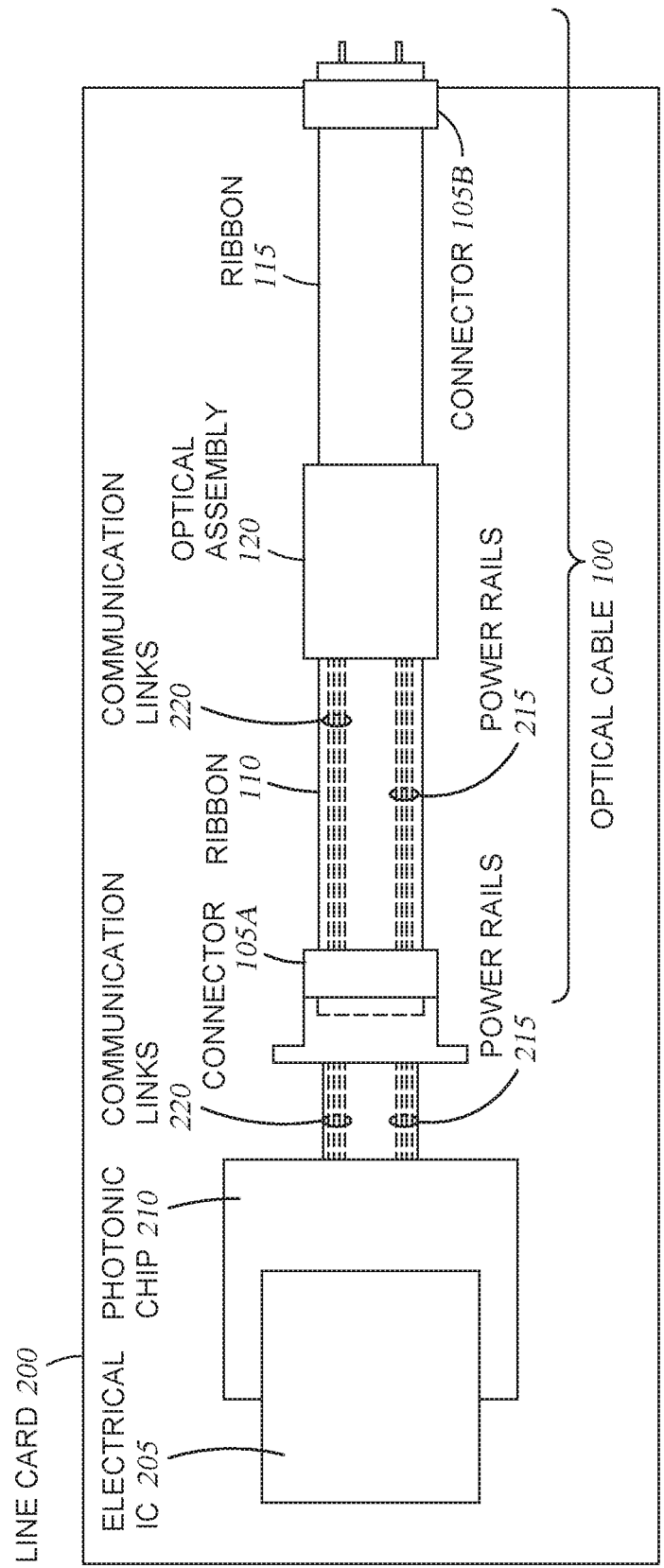
FIGS. 2A and 2B illustrate views of a linecard connected to an intelligent optical cable, according to one embodiment described herein.
Figure 2B:
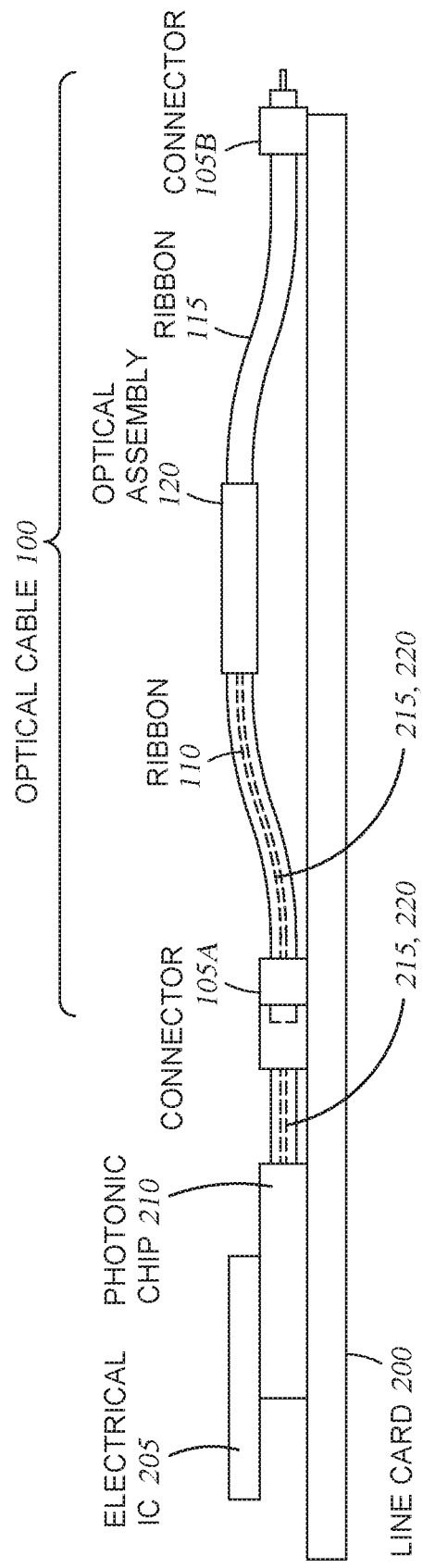

FIGS. 2A and 2B illustrates views of a linecard connected to an intelligent optical cable, according to one embodiment described herein. FIG. 2A illustrates a top view of a linecard 200 while FIG. 2B illustrates a side view of the linecard 200.

As shown, the linecard 200 includes an electrical IC 205 disposed on top of a photonic chip 210. The IC 205 and the photonic chip 210 may both be formed using a semiconductor material (e.g., silicon or a III-V semiconductor) but this is not a requirement. The electrical IC 205 can provide electrical signals that control the optical functions of the photonic chip 210. In one embodiment, the electrical signals are high-speed signals that can perform optical modulation or phase shifting. The electrical IC 205 can also receive electrical signals from the photonic chip 210 as part of, for example, converting received optical signals into electrical signals. In one embodiment, the electrical IC 205 is bonded using solder connections to the photonic chip 210.

In one embodiment, the electrical IC 205 and the photonic chip 210 form a photonic platform that transmits optical signals into, or receives optical signals from, the optical cable 100. In addition to transferring optical signals, the linecard 200 also includes communication link 220 and power rails 215 (formed by wires or traces) extending between the photonic chip 210 to the connector 105A in the optical cable 100. Using the communication links 220, the photonic chip 210 can transmit instructions for configuring and controlling the optical assembly 120 in the optical cable 100. Using the power rails 215, the photonic chip 210 can provide power to the optical assembly 120 so it can perform its optical function.

Communication links 220 and power rails 215 also extend from the connector 105A into the ribbon 110. That is, the ribbon 110 includes wires that carry communication signals and power received from the photonic chip 210 to the optical assembly 120. However, in this embodiment, the communication links 220 and power rails 215 do not extend past the optical assembly 120 (e.g., the ribbon 115 includes optical fibers while the ribbon 110 includes both optical fibers (not shown) and conductive wires forming the communication links 220 and the power rails 215).

FIG. 2B illustrates a side view of the linecard 200 and the optical cable 100. As shown, a bottom surface of the electrical IC 205 is bonded (e.g., solder bonded) to a top surface of the photonic chip 210. This facilitates transmitting high speed electrical signals between the IC 205 and the chip 210.

Further, the optical cable 100 is attached to the linecard 200 via the connectors 105A and 105B. That is, mechanical connectors (e.g., clips or pins) can be used to attach the connectors 105A and 105B to the linecard 200. Or the connectors 105A and 105B may be attached to the linecard 200 by being plugged into respective adapters that are attached to the linecards 200. However, the remaining portions of the cable 100—i.e., the ribbons 110, 115 and optical assembly 120—are not directly attached to the linecard 200 in FIG. 2B, but rather indirectly attached to the linecard 200 via the connectors 105A and 105B. In one embodiment, the cable 100 is removable from the linecard 200. That is, the connectors 105A and 105B can be unplugged from respective adapters or released from any mechanical connectors so that the optical cable 100 can be removed and replaced by another cable if desired.

Figure 3:
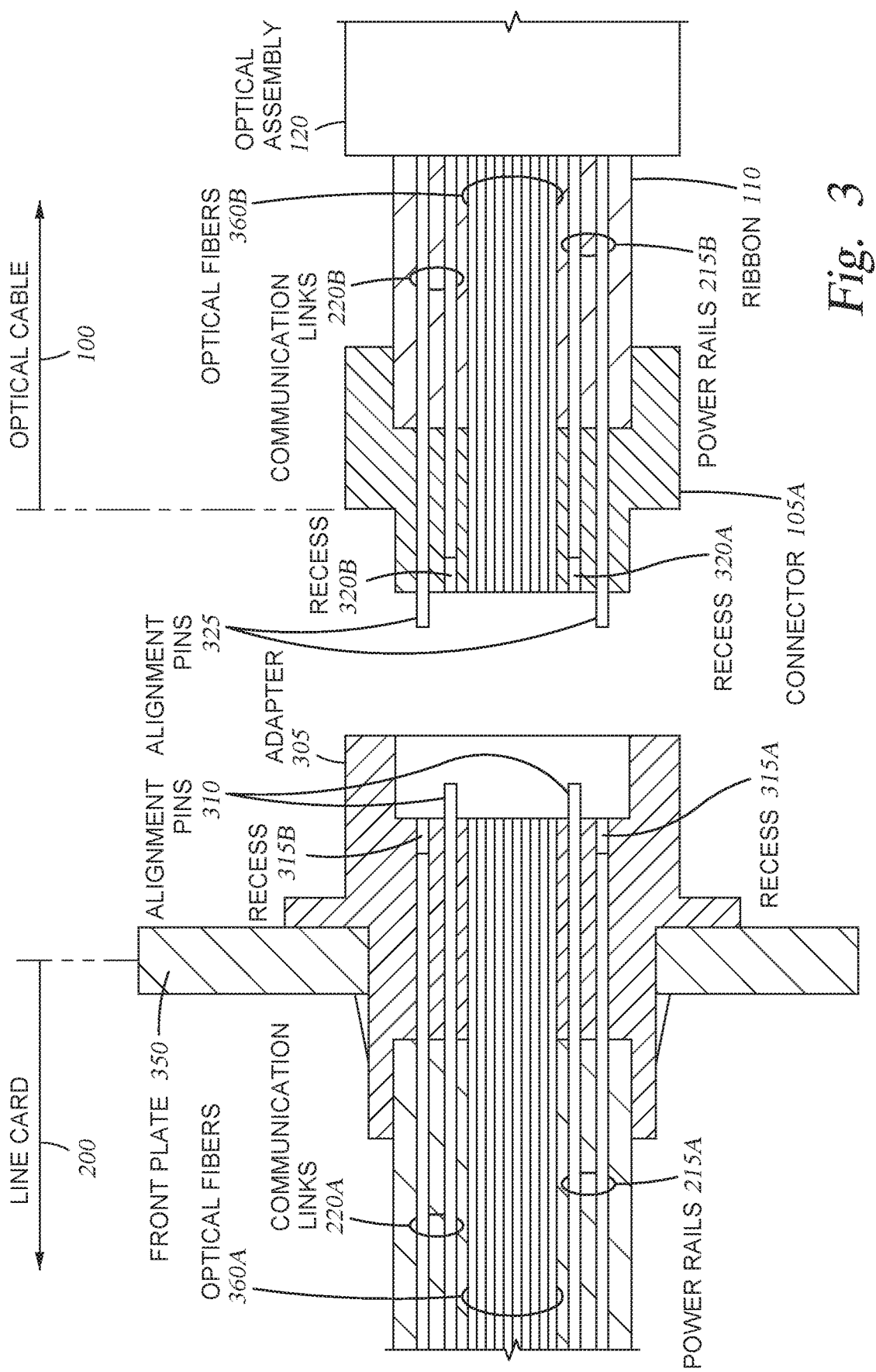
FIG. 3 illustrates mating an intelligent optical cable to a linecard, according to one embodiment described herein.

FIG. 3 illustrates mating an intelligent optical cable 100 to an adapter 305 mounted on the linecard 200, according to one embodiment described herein. As shown, the linecard 200 includes a front plate 350 on which the adapter 305 is mounted. The adapter 305 includes various alignment features—e.g., alignment pins 310 and recesses 315A and 315B—which permit the adapter 305 to match with various alignment features—e.g., alignment pins 325 and recesses 320A and 320B—on the connector 105A in the intelligent optical cable 100.

The linecard 200 includes communication links 220A and power rails 215A which extend from the photonic chip (not shown), through the front plate 350, and terminate at the adapter 305. In this example, one of the communication links 220A and one of the power rails 215A extend out of the adapter 305 to form the alignment pins 310 while the other communication link 220A and the other power rail 215A terminate at the recesses 315A and 315B. Similarly, the optical cable 100 includes communication links 220B and power rails 215B that start in the connector 105A, extend through the ribbon 110, and terminate at the optical assembly 120.

Mating the adapter 305 to the pluggable connector 105A creates an electrical connection between the communication links 220A in the linecard 200 and the communication links 220B in the optical cable 100 and between the power rails 215A in the linecard 200 and the power rails 215B in the optical cable 100. That is, the alignment pins 310 (which include one communication link 220A and one power rail 215A) mate with the recesses 320A and 320B in the connector 105A while the alignment pins 325 in the connector 105A mate with the recesses 315A and 315B in the adapter 305. In this manner, electrical connections are formed between the communication links 220A and 220B and the power rails 215A and 215B so that a photonic platform (e.g., a controller) in the linecard 200 can transmit digital communication signals and power to the optical assembly 120.

Mating the adapter 305 to the pluggable connector 105A also aligns optical fibers 360A in the linecard 200 to optical fibers 360B in the optical cable 100. That is, when the alignment pins 310, 325 are mated with their corresponding recesses 315A and 315B, 320A and 320B, this passively aligns the optical fibers 360A and 360B so that optical signals can be transmitted between the photonic platform and the optical cable 100.

Figure 4:
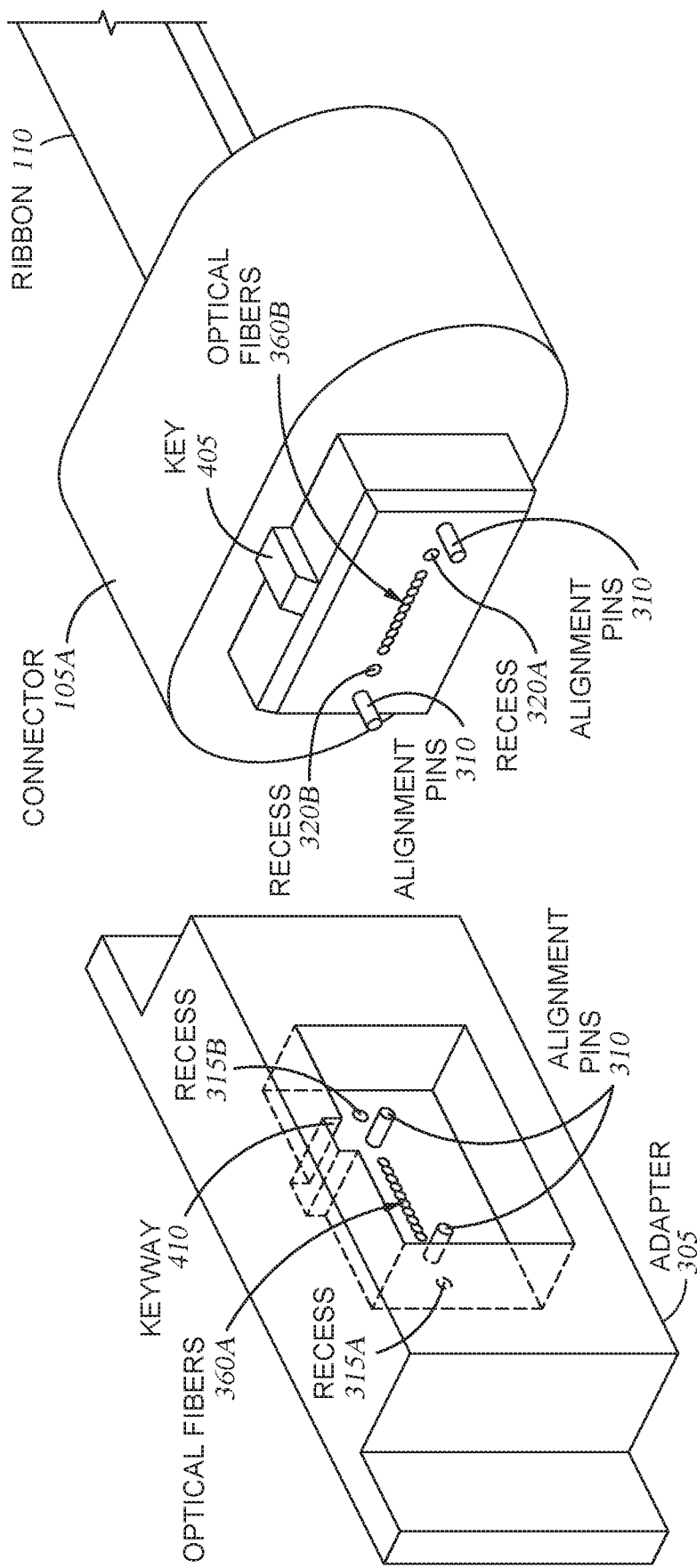
FIG. 4 illustrates a connector for an intelligent optical cable and an adapter for a linecard, according to one embodiment described herein.

FIG. 4 illustrates the connector 105A for an intelligent optical cable and the adapter 305 for a linecard, according to one embodiment described herein. FIG. 4 illustrates just one example of a structural design suitable for the pluggable connectors 105A and 105B and the adapter 305. In one embodiment, FIG. 4 illustrates modifying a Multi-fiber Push On (MPO) connector to accommodate the communication links and power rails used by the intelligent optical fiber.

As shown, the connector 105A includes the recesses 320A and 320B which have a same spacing as corresponding alignment pins 310 in the adapter 305. The connector 105A also includes the alignment pines 325 disposed on the outside of the recesses 320A and 320B which have a spacing that corresponds to the recesses 315A and 315B in the adapter 305. As mentioned before, when the alignment pins 310, 325 are inserted into the recesses 315A and 315B, 320A and 320B, doing so establishes electrical connections between communication links and power rails in the linecard and the intelligent optical cable.

In addition, the connector 105A includes a key 405 which aligns with a keyway 410 in the adapter 305 when the connector 105A is properly seated in the adapter 305. The combination of the alignment pins, 310, 325, recesses 315A and 315B, 320A and 320B, key 405, and keyway 410 are alignment features that aid to passively align the optical fibers 360A in the adapter 305 with the optical fibers 360B in the connector 105A (and ribbon 110).

In one embodiment, the adapter 305 is backwards compatible with a MPO connector that is part of a passive optical cable. For example, the MPO connector for a passive optical cable does not receive digital (electrical) communication signals and power from the linecard. As such, the MPO connector may include the key 405 and the recesses 320A and 320B but not include the alignment pins 325. Such an MPO connector can still mate, and operate with the adapter 305 which is designed to attach to both intelligent and passive optical cables. That is, the key 405 and the recesses 320A and 320B in the MPO for a passive optical cable can still mate with the keyway 410 and alignment pins 310 in the adapter 305. However, the recesses 320A and 320B in the MPO connector may be insulative material. Thus, any communication signals or power carried by the alignment pins 310 in the adapter 305 would not be transmitted into the passive optical cable when mated with the MPO connector. In this manner, the adapter 305 is backwards compatible with MPO connectors for passive optical cables, and as a result, both passive and intelligent optical cables can be connected to the linecard and used to transmit optical signals.

Figure 5:
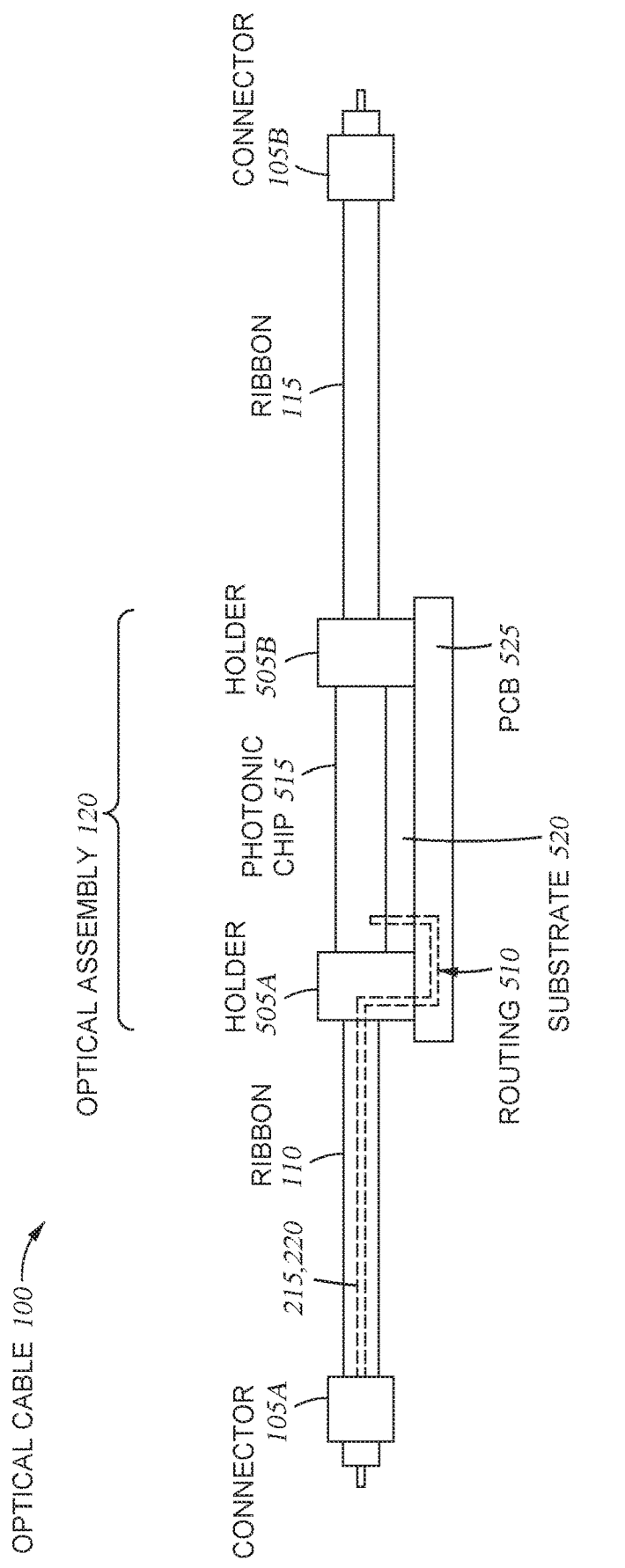
FIG. 5 illustrates an optical assembly in an intelligent optical cable, according to one embodiment described herein.

FIG. 5 illustrates the optical assembly 120 in the intelligent optical cable 100, according to one embodiment described herein. As shown by the side view of the cable 100, the ribbon 110 includes communication links 220 and power rails 215 that extend between the connector 105A and the optical assembly 120. The optical assembly 120 includes holders 505A and 505B which couple the optical assembly 120 to the ribbons 110, 115. That is, the holder 505A establish a mechanical connection between the ribbon 110 and the optical assembly 120 which, in one embodiment, is permanent (e.g., is not pluggable). This mechanical connection also aligns the optical fibers (not shown) in the ribbons 110, 115 to corresponding waveguides in a photonic chip 515 in the optical assembly 120. This optical connection between the fibers in the ribbons 110, 115 and the photonic chip 515 can be effected using butt coupling, evanescent coupling, lenses, optical couplers embedded in the photonic chip 515, and the like.

The wires forming the communication links 220 and power rails 215 are routed from the ribbon 110 into the holder 505A. From there, the optical assembly 120 includes routing 510 which routes the communication signals and power to a printed circuit board (PCB) 525, through a substrate 520, and into the photonic chip 515. For example, the routing 510 may include different metal layers and vias in the holder 505A, PCB 525, and the substrate 520. In one embodiment, the substrate 520 may be a semiconductor material (e.g., a silicon interposer).

In one embodiment, the photonic chip 515 is made from a semiconductor substrate (e.g., a silicon or III-V semiconductor material). As discussed in more detail below, the photonic chip 515 can include any number of optical components such as waveguides, optical switches, filters, amplifiers, attenuators, and the like. While the photonic chip 515 can perform optical modulation, usually this requires high speed optical signals. In one embodiment, the communication links 220 may transmit lower-speed serial data using a communication protocol such as I2C or serial peripheral interface (SPI), and thus, is unable to drive a modulator at frequencies used in modern optical signals. For example, while the photonic chip 515 can re-route, filter, amplify, attenuate, etc. the optical signals passing through the optical cable 100, it might not perform functions that require higher speed electrical signals.

Figure 6:
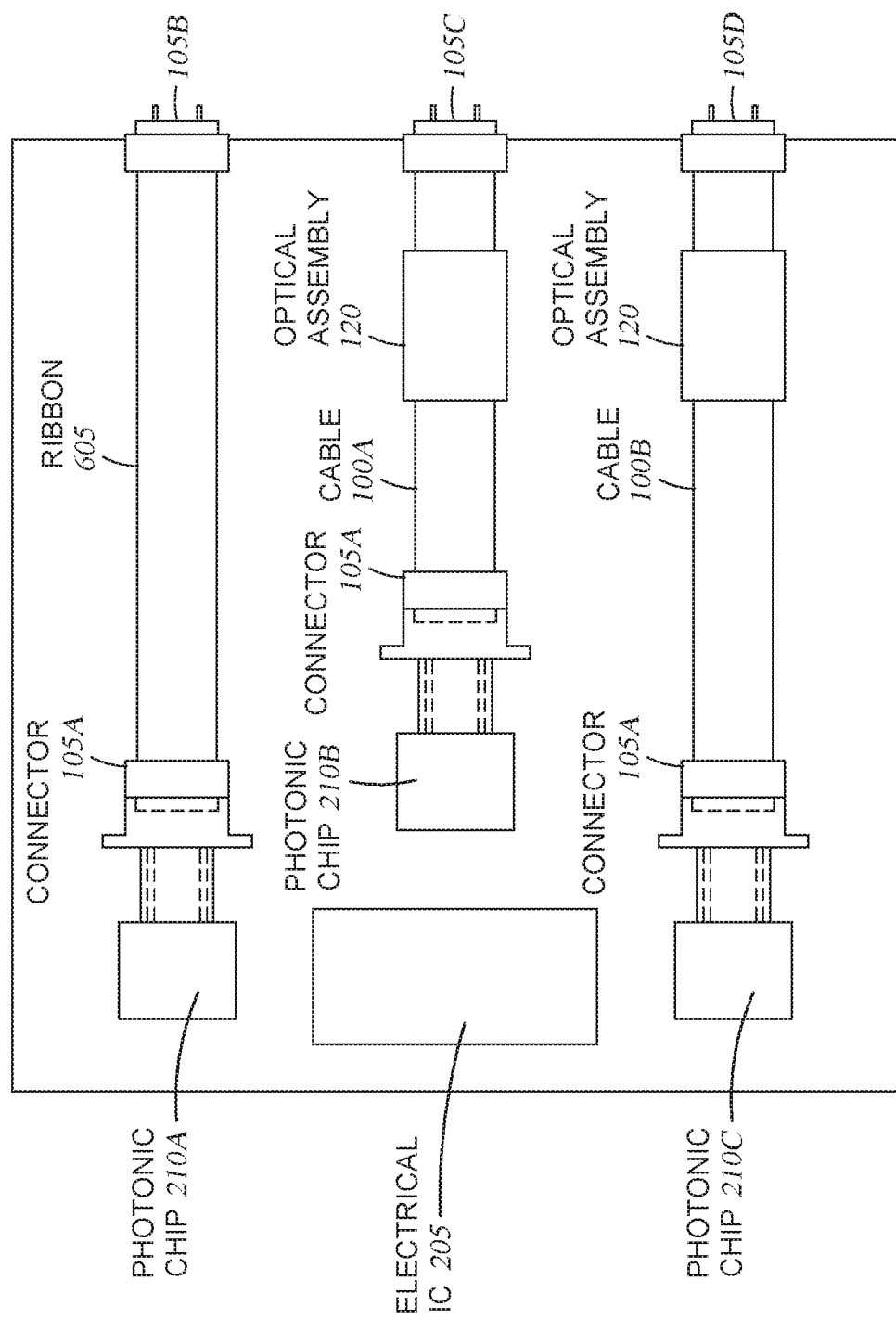
FIG. 6 illustrates a linecard with internal intelligent optical cables, according to one embodiment described herein.

FIG. 6 illustrates a linecard 600 with internal intelligent optical cables 100A and 100B, according to one embodiment described herein. In addition to having two intelligent optical cables 100, the linecard 600 also includes a passive optical cable represented by the ribbon 605. Unlike the intelligent optical cables 100 which include multiple ribbons and an optical assembly 120, the passive optical cable includes only the ribbon 605 extending between two pluggable connectors.

FIG. 6 illustrates that a linecard 600 can include a mix of intelligent and passive optical cables. Because these cables are mounted on the linecard 600, they are referred to as internal optical cables. That is, the optical signal transmitted between the photonic chips 210A and 210B and the optical cables 100A and 100B flow through the optical assemblies 120, and thus, are altered by their associated optical functions (assuming the photonic chips 210A and 210B have activated those functions). Conversely, the optical signals transferred between the photonic chip 210C and the ribbon 605 are unaffected by the passive optical cable, except for the inherent attenuation occurring from optical loss. While the photonic chip 210C is shown connected to a passive optical cable, the photonic chip 210C may also be compatible with the intelligent optical cables 100. Thus, if desired, the passive optical cable could be unplugged from the linecard 600 and replaced by an intelligent optical cable 100. The reverse could be done with the photonic chips 210A and 210B where the intelligent optical cables 100A and 100B can be unplugged and replaced by passive optical cables.

One of the connectors of the optical cables 100A and 100B (e.g., the connector 105B) is disposed at an edge of the linecard 600. These connectors serve as external optical ports for the linecard 600 so that additional optical cables can be coupled to the linecard 600 which permit the linecard 600 to optically communicate with other optical systems (e.g., other linecards or servers).

In one embodiment, the linecard 600 may be shipped to a customer with internal optical cables where some or all of the optical cables are intelligent. However, the optical functions of the cables may be locked. The customer can then purchase a software key or license from the vender to unlock (or use) the optical functions of the optical assemblies in the intelligent optical cables. That is, without the software license, the intelligent optical cables behave like a passive optical cable where optical signals pass through the optical assembly 120 without being altered. Once the customer purchases the software license, the photonic platform permits the customer to activate the optical functions of the optical assembly. These functions can be licensed al-a-carte (the customer can purchase only one or two of the total optical functions that can be performed by the optical assembly 120) or as a whole.

Figure 7:
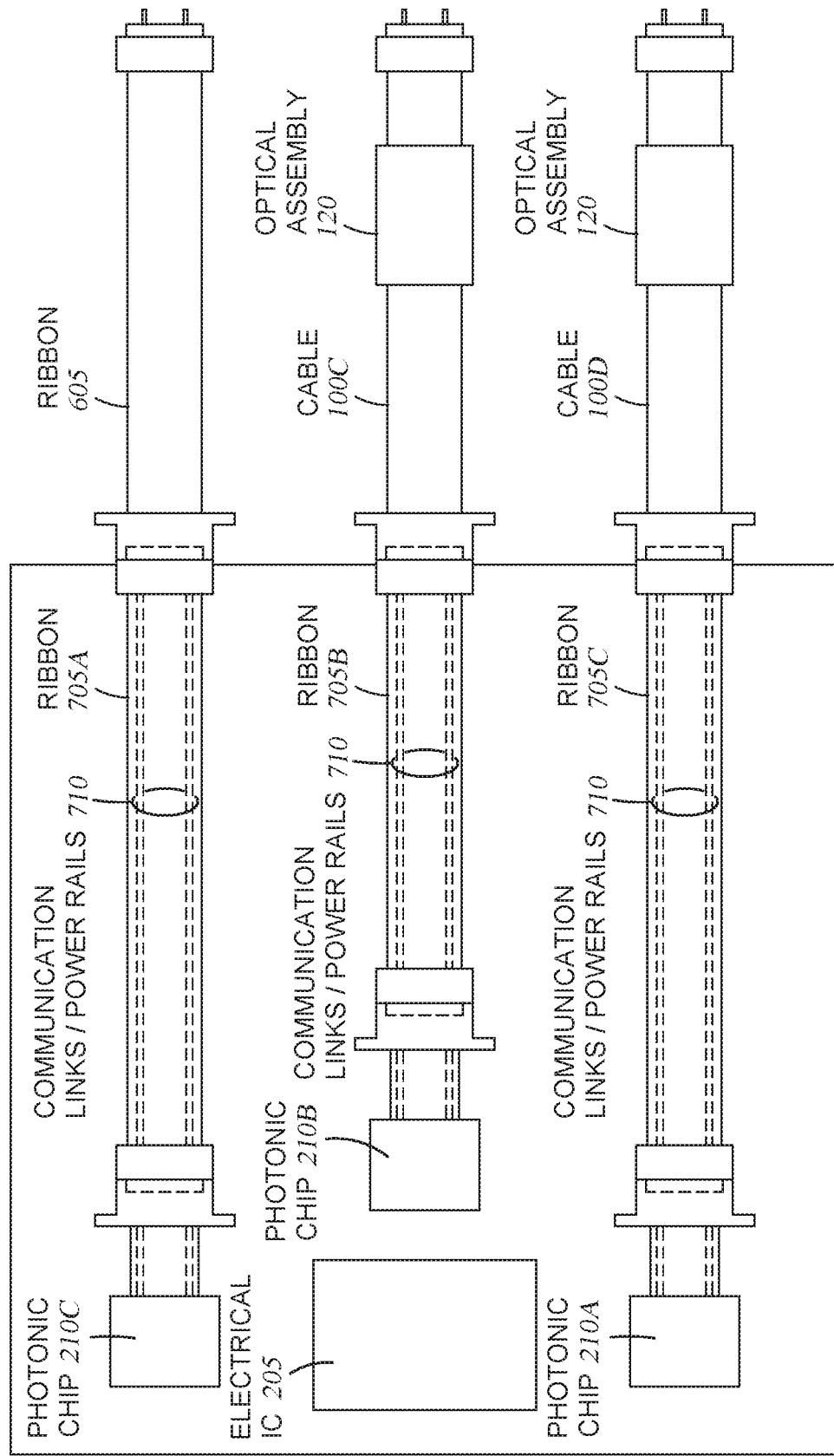
FIG. 7 illustrates a linecard connected to external intelligent optical cables, according to one embodiment described herein.

FIG. 7 illustrates a linecard 700 connected to external intelligent optical cables, according to one embodiment described herein. Unlike in the linecard 600, all the internal optical cables in the linecard 700 are passive optical cables that lack the intelligence provided by configuring an optical assembly. Instead, intelligent optical cables 100 are connected to the external optical ports on the linecard 700. In this example, intelligent optical cables 100C and 100D are connected to two of the ports while a passive optical cable (e.g., the ribbon 605) is coupled to the third port. This gives the customer flexibility to easily switch in and out passive and intelligent optical cables without having to change the internal optical cables. Because the ribbon 605, and cables 100C and 100D are connected to external optical ports, they are referred to as external optical cables. These external optical cables can be used to communicatively couple the linecard 700 to different linecards or optical systems.

To support using intelligent optical cables 100C and 100D as external optical cables, the internal optical cables (e.g., the ribbons 705A-C and associated pluggable connectors) include power and data links 710 to transfer the power and communication signals from the photonic chips 210 to the external optical ports. That is, while the ribbons 705A-C are passive optical cables (and lack the intelligence of the optical cables 100), they are different from other types of passive optical cables since they include wires that form the power and data links 710. These wires enable the external intelligent optical cables 100 to receive power and data signals from the photonic chips 210.

Figure 8:
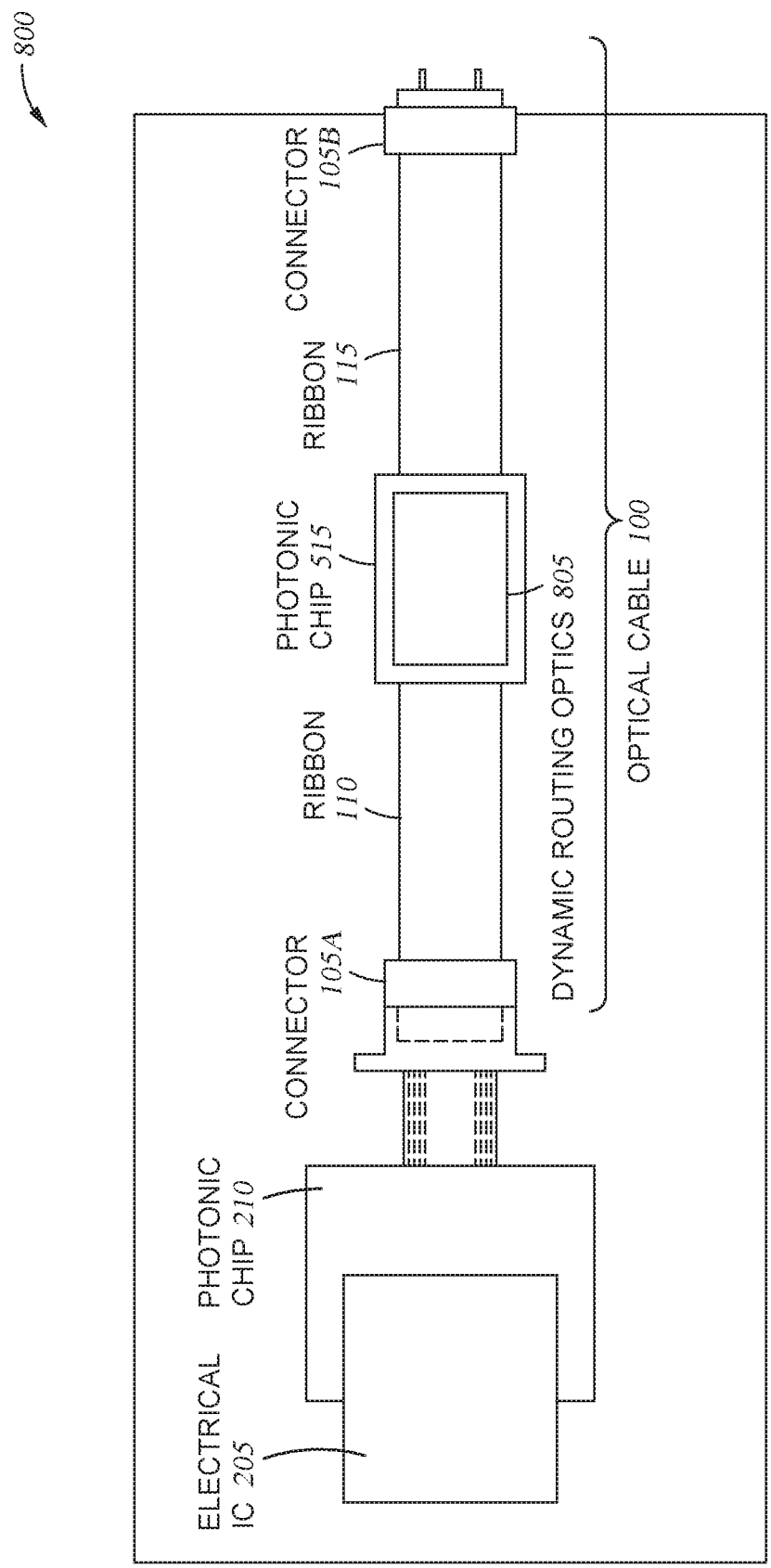
FIGS. 8-13 illustrate various uses of an optical assembly in an intelligent optical cable, according to embodiments described herein.

FIGS. 8-13 illustrate various uses of an optical assembly in an intelligent optical cable, according to one embodiment described herein. FIG. 8 illustrates an optical system 800 where the photonic chip 515 in the intelligent optical cable 100 includes dynamical routing optics 805. The dynamic routing optics 805 may include one or more optical switches than enable the photonic chip 515 to reroute the signals carried on the optical fibers. In one embodiment, the dynamic routing optics 805 supports three different types of optical routing: straight, reversed, and flipped pairs.

During straight routing, optical signals pass through the photonic chip as they would if the optical cable 100 was a passive optical cable. For example, assume the ribbons 110, 115 each have twelve fibers labeled Optical Fibers 1-12. In straight through routing, the dynamic routing optics 805 receives an optical signal transmitted by Optical Fiber 1 in ribbon 110 and outputs that optical signal into Optical Fiber 1 in ribbon 115. Similarly, the optics 805 route the optical signal propagating in Optical Fiber 2 in ribbon 110 to Optical Fiber 2 in ribbon 115, and so forth.

During reversed routing, the dynamic routing optics 805 reverse the connection of the optical fibers in the ribbons 110, 115. For example, the optics 805 receive an optical signal on Optical Fiber 1 in ribbon 110 but output it on Optical Fiber 12 in ribbon 115. Similarly, the optics 805 receive an optical signal on Optical Fiber 2 in ribbon 110 and output it on Optical Fiber 11 in ribbon 115, and so forth.

During flipped pairs routing, the dynamic routing optics 805 flip the pairs of optical fibers in the two ribbons 110, 115. That is, an optical signal received on Optical Fiber 1 of the ribbon 110 is output on Optical Fiber 2 of the ribbon 115. An optical signal received on Optical Fiber 2 of the ribbon 110 is output on Optical Fiber 1 of the ribbon 115. Similarly, an optical signal received on Optical Fiber 3 of the ribbon 110 is output on Optical Fiber 4 of the ribbon 115, while an optical signal received on Optical Fiber 4 of the ribbon 110 is output on Optical Fiber 3 of the ribbon 115, and so forth.

The dynamic routing optics 805 can be configured to perform any of these types of routings based on the data signals received from the external photonic platform (e.g., the electrical IC 205 and photonic chip 210). Further, the photonic platform can dynamically change the routing technique performed by the dynamic routing optics 805. For example, the photonic chip 210 may initially configure the photonic chip 515 to perform flipped pairs routing but then instruct the photonic chip 515 to begin performing reverse routing.

Figure 9:
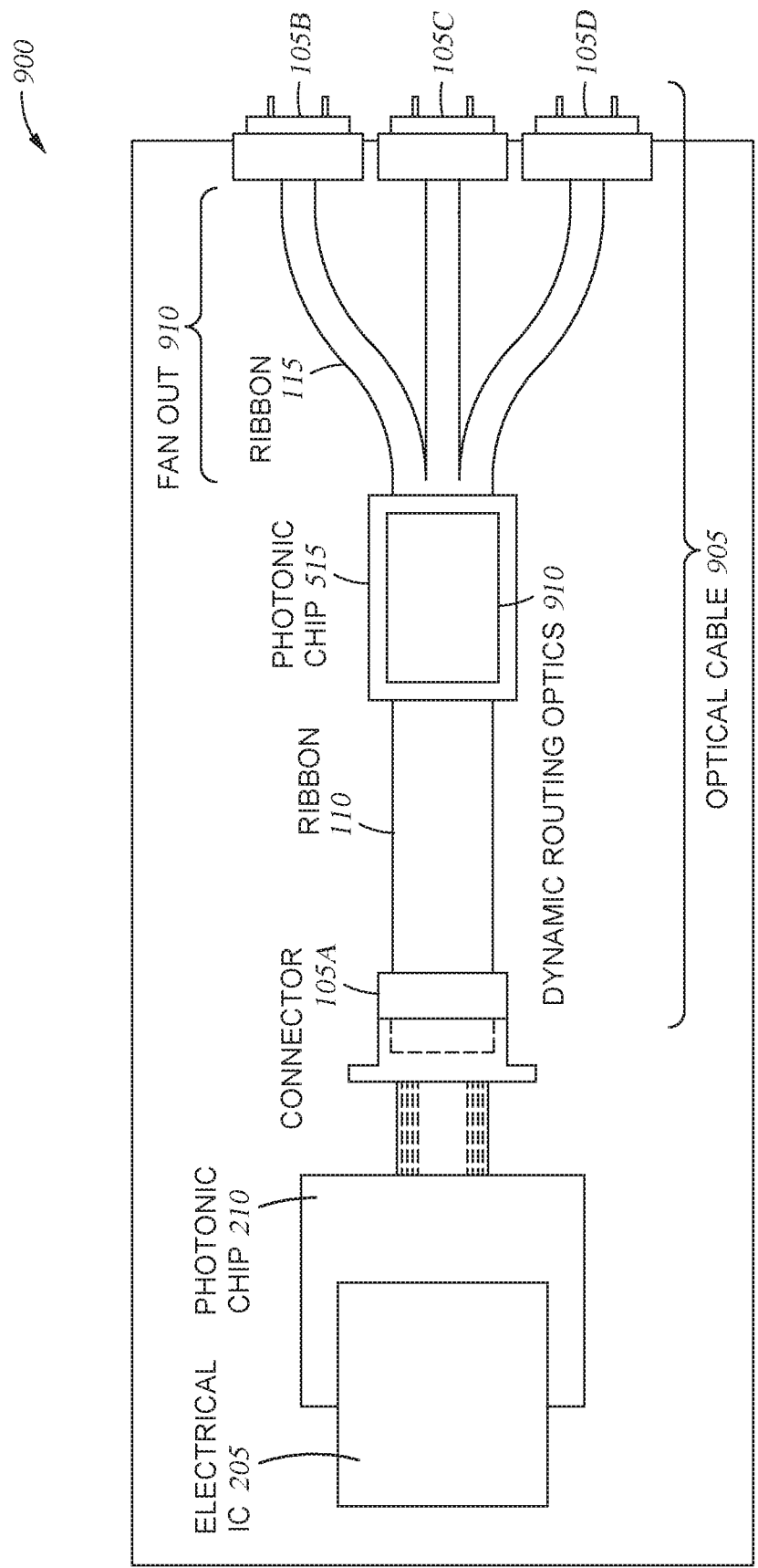

FIG. 9 illustrates an optical system 900 where the photonic chip 515 in an intelligent optical cable 905 includes a fan out 910. In this example, the photonic chip 515 includes dynamic routing optics 910 that perform different types of routing like the dynamic routing optics 805 in FIG. 8. Rather than having only two pluggable connectors, the intelligent optical cable 905 includes one connector 105A at one end and three connectors 105B, 105C, 105D on its other end. In one embodiment, the optical cable 905 may be used when going from a high-density port (e.g., the port to which the connector 105A is coupled) to several low-density ports (e.g., the ports coupled to the connectors 105B-D). For example, 36 optical fibers may extend through the connector 105A (and the corresponding ribbon) while only 12 optical fibers extend through the connectors 105B-D (and their corresponding ribbons in the fan out 910).

The dynamic routing optics 910 can support doing different types of optical routing for the different connectors 105B-D. For example, the dynamic routing optics 910 can, in parallel, (i) perform straight through routing between the optical fibers extending through the connector 105B and the corresponding 12 optical fibers in the connector 105A, (ii) perform reverse routing between the optical fibers extending through the connector 105C and the corresponding 12 optical fibers in the connector 105A, and (iii) perform flipped pair routing between the optical fibers extending through the connector 105D and the corresponding 12 optical fibers in the connector 105A. Alternatively, the silicon chip 210 can send digital instructions to individually change these routing strategy dynamically. For example, the chip 210 can instruct the dynamic routing optics 910 perform reverse routing for the fibers in the three connectors 105B-D.

Figure 10:
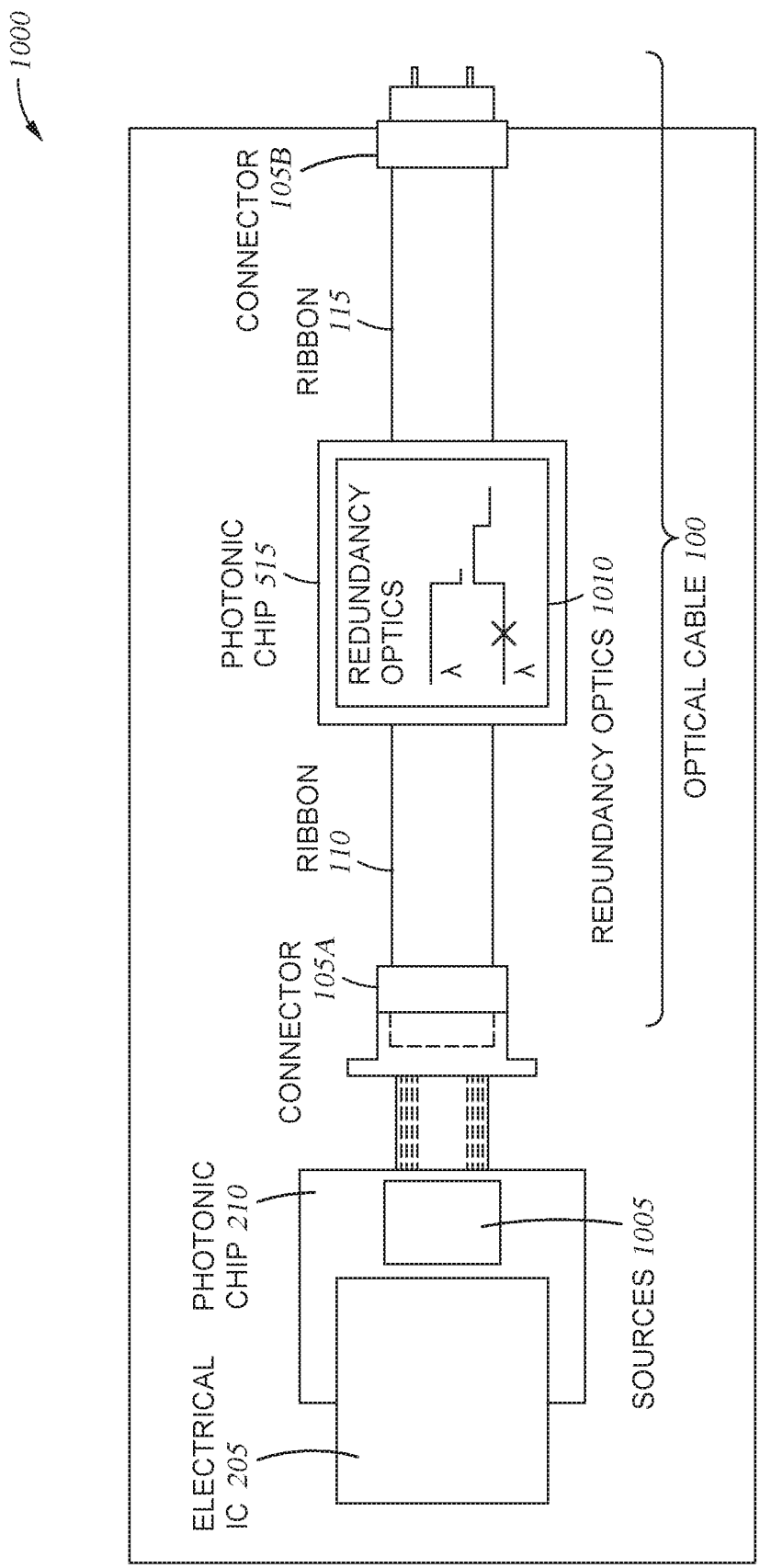

FIG. 10 illustrates an optical system 1000 where the photonic chip 515 in the intelligent optical cable 100 provides redundancy in case an optical link fails. In the optical system 1000, the photonic chip 210 includes optical sources 1005 which generate optical signals that are then transmitted into the optical cable 100. In one embodiment, the sources 1005 include one or more light sources that are used to transmit data. That is, the sources 1005 includes at least one redundant light source (or standby light source). For example, the photonic chip 210 may generate an 800G optical link using eight sources that each transmit 100G. In addition to those eight sources, the photonic chip 210 can include at least one redundant source that also transmits an optical signal from the chip 210 into the optical cable 100.

The photonic chip 515 includes redundancy optics 1010 that can swap out optical signals for the optical signal transmitted by the redundant source. Continuing the example above, assume that one of the eight primary light sources fails. In response, the photonic chip 210 can begin transmitting the optical signal sent by the failed light source on the redundant light source. The photonic chip 210 also instructs the photonic chip 515 to route the optical signal received on the redundant light source on the same optical fiber that previously transmitted the now failed light source. For example, for simplicity assume that the photonic chip transmitted the optical signals for the eight primary light sources on Optical Fibers 1-8 and the standby light source on Optical Fiber 9. During normal operation, the redundancy optics 1010 will ignore (e.g., does not output) any optical signal received on Optical Fiber 9 from the standby light source and outputs the optical signals for the eight primary light source on Optical Fibers 1-8 in the ribbon 115. However, if, the light source transmitting on Optical Fiber 1 fails, for example, the photonic chip 210 instructs the redundancy optics 1010 to route the optical signal received on Optical Fiber 9 in the ribbon 110 (i.e., the redundant light source) out on Optical Fiber 1 in the ribbon 115 (assuming straight through routing to the downstream optical component). Thus, the downstream optical component continues to receive the optical signal on the same optical fiber in the ribbon 115 even though the original light source failed.

The optical system 1000 can include any number of redundant light sources 1005. For example, if the system 1000 has two redundant light sources, then the photonic chip 210 can use the redundancy optics 1010 to reroute the optical signals generated by those two redundant light sources to replace two failed primary light sources.

Figure 11:
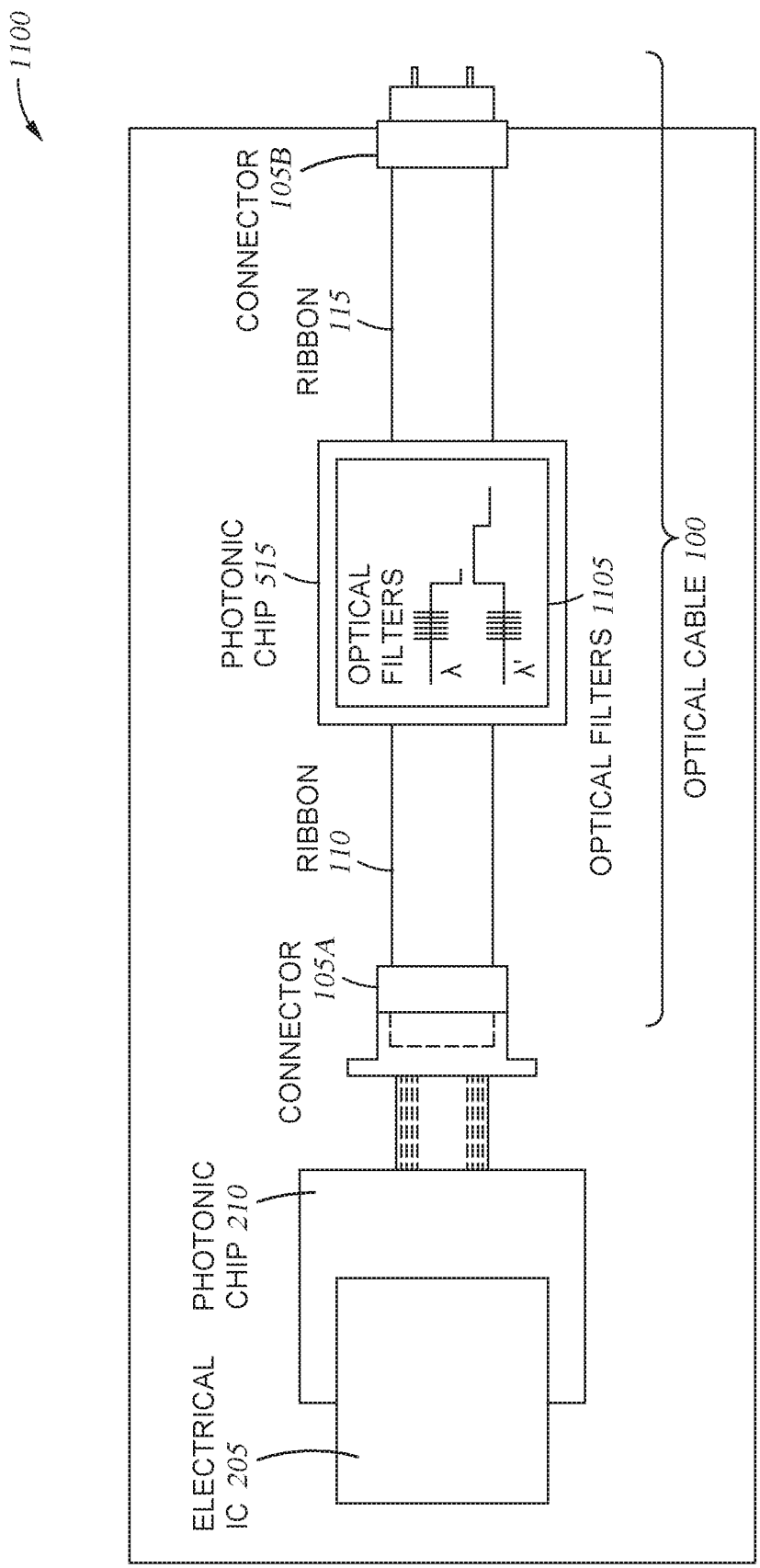

FIG. 11 illustrates an optical system 1100 where the intelligent optical cable 100 includes a photonic chip 515 with optical filters 1105. The photonic chip 210 can control the photonic chip 515 to selectively filter the optical signals using the filters 1105. In one embodiment, the photonic chip 210 uses the filters 1105 to support bi-directionality in the optical links or ports (e.g., the photonic chip 210 can both transmit and receive optical signals using the same optical fiber in the optical cable 100). Rather than having to place the optical filters in the photonic chip 210, these filters 1105 can be placed in the optical cable 100 which are tunable according to wavelength.

Figure 12:
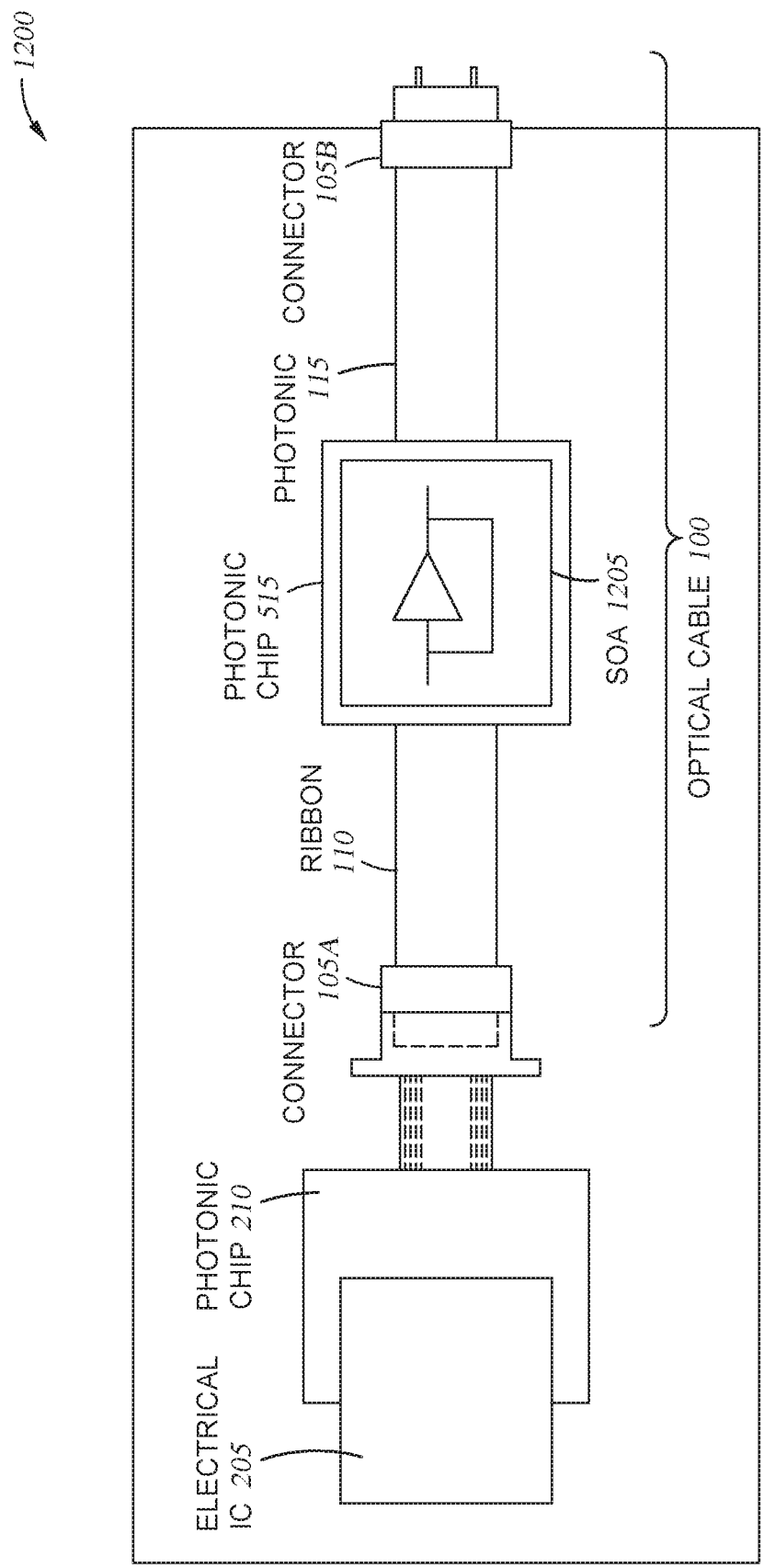

FIG. 12 illustrates an optical system 1200 where the intelligent optical cable 100 performs optical amplification. As shown, the photonic chip 515 includes a semiconductor optical amplifier (SOA) 1205 that the photonic chip 210 can control to selectively amplify one or more of the optical signals transmitting through the optical fibers in the optical cable 100. The SOA 1205 can be used to extend an optical link by permitting the use of longer optical cables. Additionally or alternatively, the photonic chip 515 may also include optical attenuators—e.g., variable optical attenuators (VOAs)—for selectively attenuating the optical signals propagating through the cable 100.

Figure 13:
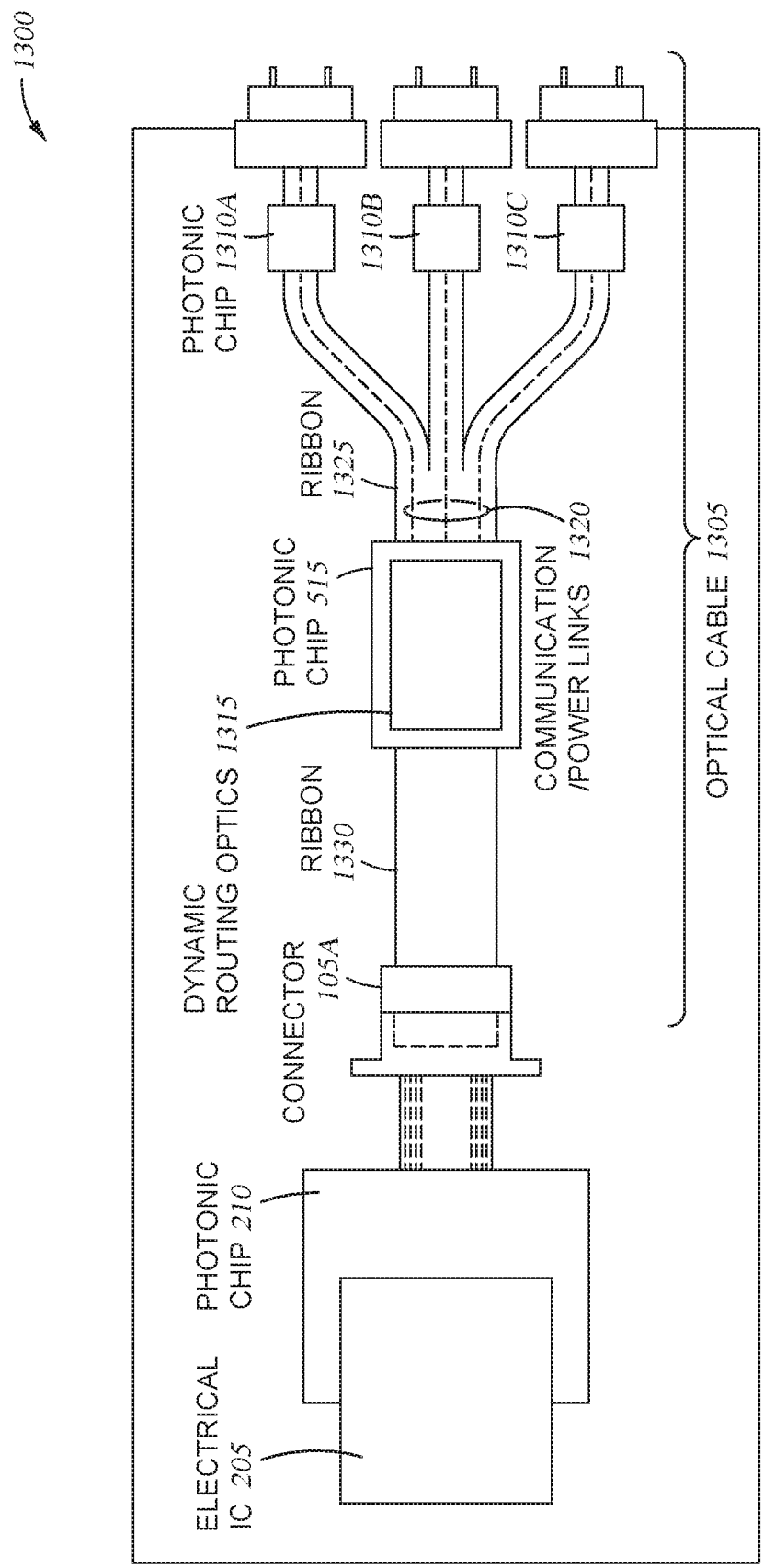

FIG. 13 illustrates an optical system 1300 which includes an intelligent optical cable 1305 with multiple photonic chips 515, 1310A-C. As shown, the optical cable 1305 includes the photonic chip 515 that is coupled to the ribbon 1330 on one side and the ribbon 1325 on the opposite side. The ribbon 1325 then fans out and couples to the three photonic chips 1310A-C. These chips 1310A-C are in turn coupled to three respective pluggable connectors via additional ribbons.

The ribbon 1330 and the ribbon 1325 can include communication links and power rails for powering the photonic chips 515, 1310A-C. For example, the optical assembly containing the photonic chip 515 can route the communication links and power rails received from the ribbon 1330 to its photonic chip 515 as well as the ribbon 1325. The three optical assemblies containing the three photonic chips 1310A-C can receive the communication links and power rails from the ribbon 1325 and route these electrical signals to their respective photonic chip 1310A-C. For example, the ribbon 1325 can split the communication links and the power rails so that these signals reach each of the photonic chips 1310A-C. In another example, the communication links and power rails may be replicated in the optical assembly containing to the photonic chip 515 so that there are sufficient wires for carrying these signals to each of the photonic chips 1310A-C.

The photonic chip 210 can control the photonic chips 1310A-C in a similar manner as it controls the photonic chip 515 as discussed above. In one embodiment, the digital instructions transmitted on the communication links to the photonic chips 515, 1310A-C can use an addressing or identification scheme so the photonic chip 210 can transmit a particular instruction for a particular photonic chip 515, 1310A-C. That way, the photonic chip 210 can individually configure the photonic chips 515, 1310A-C to perform different optical functions.

The photonic chip 515 includes dynamic routing optics 1315 that can perform any of the routing types described above. For example, like in FIG. 9, the dynamic routing optics 1315 can perform different routing types (or the same routing types) for the optical fibers in the three paths in the fan out region of the ribbon 1325. The photonic chips 1310A-C can also perform different optical functions. For example, the photonic chip 1310A can include redundancy optics for enabling a standby optical signal received at the photonic chip 1310A (via the photonic chip 515) to be swapped for a failed light source as discussed in FIG. 10. The photonic chip 1310B may include optical filters as shown in FIG. 11 that the photonic chip 210 can tune, for example, to enable bi-directionality on one of the ports or optical fibers. The photonic chip 1310C may include SOAs and VOAs that the photonic chip 210 can selectively activate to amplify or attenuate the optical signals. Moreover, the photonic chips 515, 1310A-C can include optical components for performing multiple different optical functions. That is, each of the photonic chips 515, 1310A-C can include dynamic routing optics, optical filters, redundancy optics, SOAs, VOAs, and sub-combinations thereof. The photonic chip 210 can selectively activate and deactivate the optical components in each of the photonic chips 515, 1310A-C (where multiple optical functions can be active simultaneously).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical cable, comprising:
a first pluggable connector;
a second pluggable connector;
an optical assembly;
a first ribbon having a first end connected to the first pluggable connector and a second end connected to the optical assembly, wherein the first ribbon comprises a plurality of optical fibers and a plurality of electrical wires, wherein the plurality of electrical wires is configured to deliver power and communication signals to the optical assembly; and
a second ribbon having a first end connected to the optical assembly and a second end connected to the second pluggable connector, wherein the second ribbon comprises a plurality of optical fibers, wherein the optical assembly is configured to perform an optical function on optical signals propagating through the first ribbon and the second ribbon using the power delivered by the plurality of electrical wires.

2. The optical cable of claim 1, wherein the optical assembly comprises a photonic chip comprising waveguides aligned to the plurality of optical fibers in the first ribbon and the second ribbon.

3. The optical cable of claim 2, wherein the photonic chip is mounted on a printed circuit board (PCB), wherein the power and communication signals are routed to the photonic chip via the PCB.

4. The optical cable of claim 1, wherein the first pluggable connector and second pluggable connector each comprises a pair of recesses, wherein the first pluggable connector is configured to receive at least one of the power and communication signals via at least one of the pair of recesses when mated with an external photonic platform.

5. The optical cable of claim 4, wherein the first pluggable connector and second pluggable connector each comprises a pair of alignment pins, wherein the first pluggable connector is configured to receive at least one of the power and communication signals via at least one of the pair of alignment pins when mated with the external photonic platform.

6. The optical cable of claim 1, wherein the optical assembly is configured to at least one of activate and deactivate the optical function in response to the communication signals.

7. The optical cable of claim 1, further comprising:
a third pluggable connector, wherein the second ribbon comprises a fan out where the plurality of optical fibers are split such that a first portion is routed to the second pluggable connector and a second portion is routed to the third pluggable connector.

8. A linecard, comprising:
a first photonic chip;
an adapter comprising a first side and a second side, wherein the adapter is optically coupled on the first side to the first photonic chip; and
an optical cable plugged into the second side of the adapter, wherein the optical cable comprises:
at least two ribbons comprising optical fibers; and
a second photonic semiconductor chip disposed between the at least two ribbons such that optical signals propagate through the at least two ribbons via the second photonic semiconductor chip, wherein one of the at least two ribbons comprises a plurality of electrical wires for delivering power and communication signals to the second photonic semiconductor chip, wherein the power and communication signals are generated by the first photonic chip.

9. The linecard of claim 8, wherein the second photonic semiconductor chip performs an optical function on the optical signals based on the power and communication signals received from the first photonic chip, wherein the first photonic chip is a semiconductor chip.

10. The linecard of claim 8, further comprising:
an electrical integrated circuit (IC) coupled to the first photonic chip.

11. The linecard of claim 8, wherein the optical cable comprises a connector disposed at an edge of the linecard, wherein the connector serves as an external optical port for the linecard.

12. The linecard of claim 8, where in the first photonic chip and the second photonic semiconductor chip are silicon photonic chips, wherein the second photonic semiconductor chip comprises a plurality of waveguides aligned with the optical fibers in the at least two ribbons.

13. The linecard of claim 8, comprising:
a third photonic chip;
a second adapter comprising a first side and a second side, wherein the second adapter is optically coupled on the first side to the third photonic chip; and
a second optical cable plugged into the second side of the second adapter, wherein the second optical cable comprises:
a pair of ribbons with a fourth photonic chip disposed therebetween, wherein one of the pair of ribbons comprises a second plurality of wires for enabling the fourth photonic chip to perform an optical function, wherein the third photonic chip is configured to control the optical function performed by the fourth photonic chip.

* * * * *